J. VAN MATRE.
DRAFT EQUALIZER.
APPLICATION FILED MAY 25, 1908.
937,975.
Patented Oct. 26, 1909.
2 SHEETS—SHEET 2.
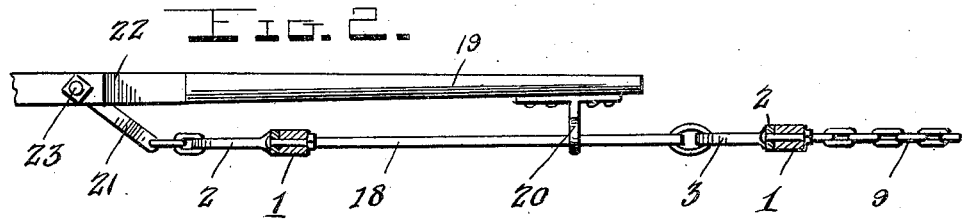
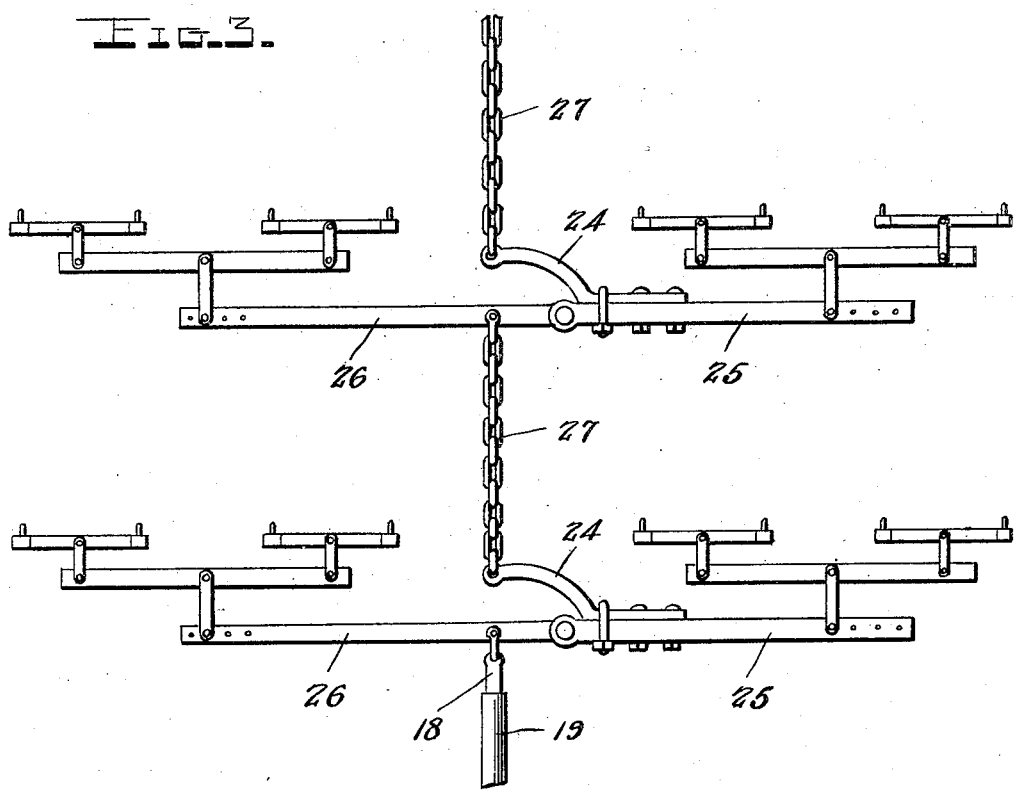
Witnesses
Chas. L. Griesbauer
C. H. Griesbauer
Inventor
Jennings Van Matre
By H. B. Willson & Co.
Attorneys

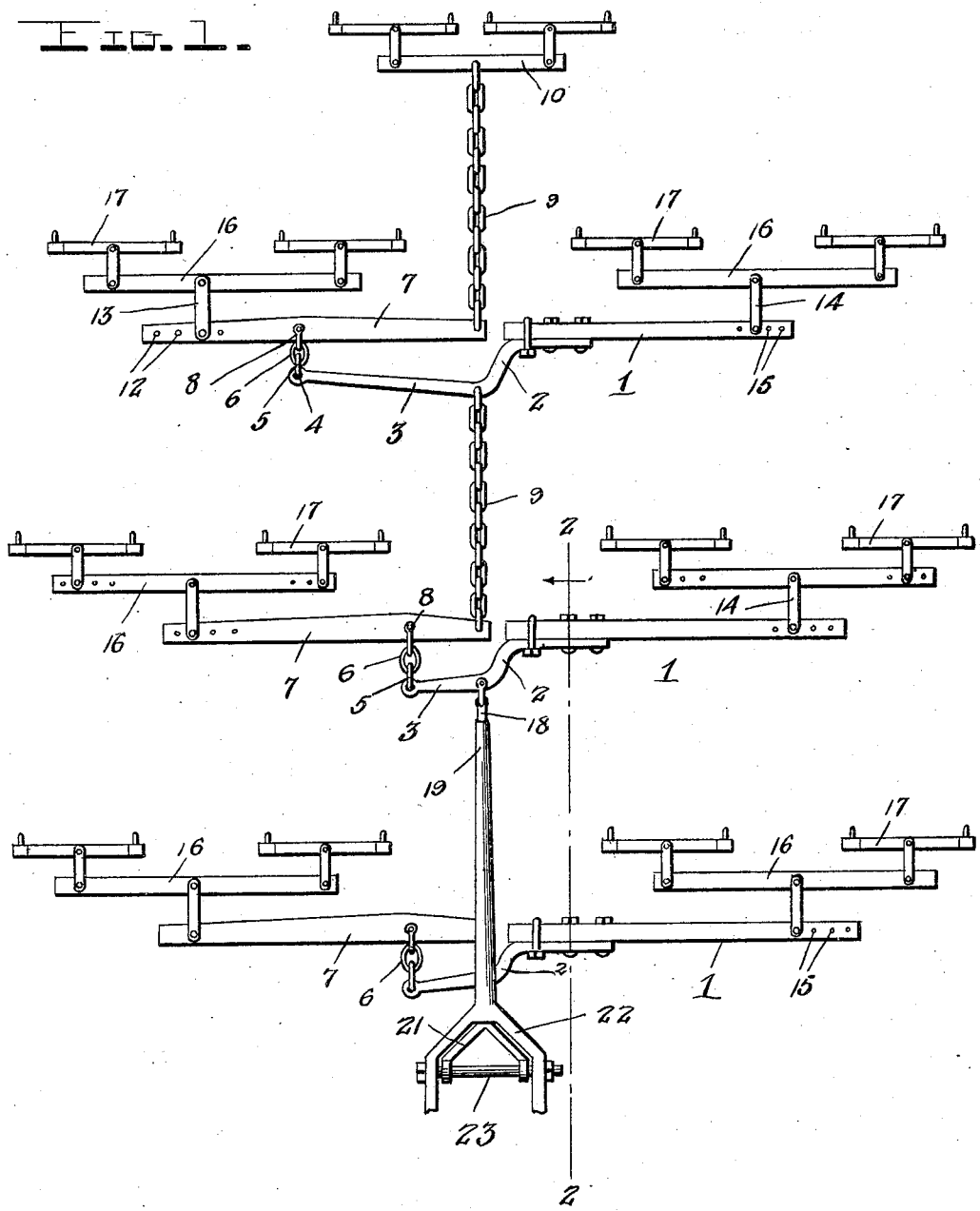

UNITED STATES PATENT OFFICE.

JENNINGS VAN MATRE, OF PASO ROBLES, CALIFORNIA.

DRAFT-EQUALIZER.

937,975.　　　　Specification of Letters Patent.　　Patented Oct. 26, 1909.

Application filed May 25, 1908. Serial No. 434,836.

*To all whom it may concern:*

Be it known that I, JENNINGS VAN MATRE, a citizen of the United States, residing at Paso Robles, in the county of San Luis Obispo and State of California, have invented certain new and useful Improvements in Draft-Equalizers; and I do declare the following to be a full, clear, and exact description of the invention, such as will enable others skilled in the art to which it appertains to make and use the same.

This invention relates to improvements in draft equalizers.

The object of the invention is to provide a device of this character by means of which the load or draft will be equally distributed to any number of draft animals.

A further object is to provide an improved means for connecting the equalizers with the tongue or pole of the machine or vehicle.

With these and other objects in view, the invention consists of certain novel features of construction, combination and arrangement of parts as will be described and particularly pointed out in the appended claim.

In the accompanying drawings, Figure 1 is a plan view of a draft equalizer constructed and arranged in accordance with the invention; Fig. 2 is a longitudinal sectional view on the line 2—2 of Fig. 1, showing the manner in which the two rear equalizers are connected together and secured to the tongue of the machine or vehicle; and Fig. 3 is a plan view showing a modified construction and arrangement of the equalizer.

Referring more particularly to Figs. 1 and 2 of the drawings, 1 denotes the evener beam of the equalizers, to the inner end and on the rear side of which is bolted or otherwise rigidly secured, the inwardly projecting offset end, 2, of a draft bar, 3. In the outer or free end of the draft bars 3 is formed an eye, 4, having engaged therewith a ring, 5. Loosely connected to the ring, 5, by a link, 6, is an equalizing lever, 7, said lever having arranged between its ends a pivotally connected clip, 8, which is engaged with the link, 6, and thereby provides a loose swinging connection with the free end of the draft bar.

To the inner end of the equalizing lever of the forward equalizers is connected the rear end of a draft chain, 9, the forward end of said chain being connected to the draft bar, 3, of the next forward equalizer adjacent to the offset end, 2, thereof. The draft chain 9 of the forward equalizer is connected at its outer end to a whiffletree, 10. In the outer ends of the equalizing levers 7 is formed a series of holes, 12, by means of which the clip, 13, is adjustably connected thereto, while a similar clip, 14, is adapted to be adjustably connected with one of a series of holes, 15, formed in the outer end of the evener beams, 1. To the clips, 13 and 14, are connected whiffletrees, 16, to the ends of which are connected swingletrees, 17, whereby any desired number of draft animals may be hitched to the equalizer.

The inner end of the lever, 7, of the rear equalizer is connected to the draft bar, 3, of the next forward equalizer by a draft rod or other rigid connection, 18, which is disposed beneath a tongue, 19, of the vehicle or machine, and is slidably supported by means of a guide ring or loop, 20, which is secured to the underside of the tongue near its outer end. The draft bar 3 of the rear equalizer is connected by a yoke, 21, to a tongue attaching yoke, 22, by a transversely disposed bolt, 23.

By providing a rigid draft bar to connect the two rear equalizers, the latter are supported by the tongue and prevented from dropping to the ground when the teams are stopped or the draft slackened. The draft bars, 3, increase in length from the rear equalizers toward the forward equalizers, and the connection between the free ends of the draft bars and their respective equalizing levers is moved to a point nearer the center of said levers for each successive equalizer as shown.

By attaching the offset end, 2, of the draft bars with the inner ends of the evener beams, as herein shown and described, a simple, strong and durable connection between these parts is provided, whereby the strain of the evener beam will be effectually resisted without danger of breaking the parts at their point of connection.

In Fig. 3 of the drawings is shown a modified arrangement of the equalizer. In this instance the draft bar, 24, is shown as bolted to the forward side of the inner end of the evener beam, 25, and to this end of the evener beam is pivotally connected the inner end of the equalizing lever, 26. In this latter form of the equalizer, the rear end of the draft chain, 27, from the next forward equalizer is connected to the free inner end of the draft bar, 24, while the forward end of the draft chain, 27, from the next rear equalizer is connected to the equalizing lever, 26, as shown. In this form of the equalizer, the draft animals can be hitched closer together.

In both forms of the equalizers, the draft chains are always in line midway between the ends of the equalizers.

From the foregoing description, taken in connection with the accompanying drawing, the construction and operation of the invention may be readily understood without requiring a more extended explanation.

Various changes in the form, proportion and the minor details of construction may be resorted to without departing from the principle or sacrificing any of the advantages of the invention as defined in the appended claim.

Having thus described my invention, what I claim as new and desire to secure by Letters-Patent, is:

A draft equalizer comprising a series of evener bars with draft bars secured to their inner ends, the forward draft bar being of greater length than those behind the same, said draft bars being bent to provide curved offsets with outwardly extended arms having eyes at their ends and at their bends, a series of equalizing levers having flexible connections which are connected to the eyes on the outer ends of said arms, a flexible means connected to the eye of the bend of the forward draft bar and to the central equalizing lever, a tongue having a yoke at its rear end having an intermediate yoke secured to the rear draft bar, the rear equalizing lever being provided with a draft rod having its rear end connected therewith, said tongue being also provided with a depending guide loop at the forward end and on its under surface for the insertion of the forward end of the draft rod, said rod having its forward terminal connected to the eye at the bend of the central draft bar, substantially as specified.

In testimony whereof I have hereunto set my hand in presence of two subscribing witnesses.

JENNINGS VAN MATRE.

Witnesses:
EDWARD BLAND,
JOHN HARROLD.